(12) United States Patent
Doerr et al.

(10) Patent No.: US 12,287,839 B1
(45) Date of Patent: Apr. 29, 2025

(54) TECHNIQUES FOR SUPPORTING COMMUNICATION BETWEEN DIFFERENT BROWSING CONTEXTS

(71) Applicant: Here Enterprise Inc., New York, NY (US)

(72) Inventors: Chuck Doerr, New York, NY (US); David Daniel Coxon, Glasgow (GB)

(73) Assignee: Here Enterprise Inc., New York, NY (US)

( * ) Notice: Subject to any disclaimer, the term of this patent is extended or adjusted under 35 U.S.C. 154(b) by 0 days.

(21) Appl. No.: 18/918,566

(22) Filed: Oct. 17, 2024

(51) Int. Cl.
*G06F 16/954* (2019.01)
*H04L 67/02* (2022.01)

(52) U.S. Cl.
CPC ............ *G06F 16/954* (2019.01); *H04L 67/02* (2013.01)

(58) Field of Classification Search
None
See application file for complete search history.

(56) References Cited

U.S. PATENT DOCUMENTS

| | | | |
|---|---|---|---|
| 9,383,958 B1 * | 7/2016 | Trahan | G06F 16/957 |
| 10,715,563 B1 * | 7/2020 | Sutherland | H04L 65/1083 |
| 10,884,834 B2 * | 1/2021 | Nguyen | G06F 9/541 |
| 11,909,806 B2 * | 2/2024 | Pathak | H04W 4/80 |
| 2005/0149616 A1 * | 7/2005 | Chapman | G06F 16/954 |
| | | | 709/203 |
| 2012/0221631 A1 * | 8/2012 | Chapman | G06F 16/954 |
| | | | 709/203 |
| 2013/0166524 A1 * | 6/2013 | Giraud | H04L 67/34 |
| | | | 707/705 |
| 2013/0238695 A1 * | 9/2013 | Giraud | H04L 67/10 |
| | | | 709/203 |
| 2015/0143223 A1 * | 5/2015 | Kolam | H04L 69/329 |
| | | | 715/234 |
| 2015/0363046 A1 * | 12/2015 | Peterson | G06F 9/451 |
| | | | 715/802 |
| 2020/0097346 A1 * | 3/2020 | Nguyen | G06F 9/541 |
| 2021/0182123 A1 * | 6/2021 | Pearce | G06F 16/957 |
| 2022/0263917 A1 * | 8/2022 | Simons | G06F 8/61 |
| 2024/0160569 A1 * | 5/2024 | Esun | G06F 12/0802 |
| 2024/0160685 A1 * | 5/2024 | Esun | G06F 16/9577 |

* cited by examiner

*Primary Examiner* — Lashonda Jacobs-Burton
(74) *Attorney, Agent, or Firm* — Womble Bond Dickinson (US) LLP

(57) ABSTRACT

A first message from a first browsing context may be identified. The first message may include a connection identifier. A second message from a second browsing context may be identified. The second message may include the connection identifier. A processing device may transfer a first port of a message channel to the first browsing context and a second port of the message channel to the second browsing context based on the first message including the connection identifier and the second message including the connection identifier.

20 Claims, 11 Drawing Sheets

400

IDENTIFYING A FIRST MESSAGE FROM A FIRST BROWSING CONTEXT, THE FIRST MESSAGE INCLUDING A CONNECTION IDENTIFIER
410

IDENTIFYING A SECOND MESSAGE FROM A SECOND BROWSING CONTEXT, THE SECOND MESSAGE INCLUDING THE CONNECTION IDENTIFIER
420

TRANSFERRING, BY A PROCESSING DEVICE, A FIRST PORT OF A MESSAGE CHANNEL TO THE FIRST BROWSING CONTEXT AND A SECOND PORT OF THE MESSAGE CHANNEL TO THE SECOND BROWSING CONTEXT BASED ON THE FIRST MESSAGE INCLUDING THE CONNECTION IDENTIFIER AND THE SECOND MESSAGE INCLUDING THE CONNECTION IDENTIFIER 430

FIG. 4

TECHNIQUES FOR SUPPORTING COMMUNICATION BETWEEN DIFFERENT BROWSING CONTEXTS

FIELD OF DISCLOSURE

This disclosure relates generally to techniques for supporting communication between different browsing contexts, and more particularly to cross origin port establishment for communication between different browsing contexts.

BACKGROUND

Browsing context may refer to an environment in which a browser displays content, such as a document. In a browser, a browsing context is usually a tab, but can be a window or event parts of a page, such as an inline frame. Each browsing context may have an origin and an ordered history of previously displayed content. Oftentimes, websites include content from various sources with different levels of trust. To prevent undesirable interactions between different browsing contexts, such as malicious actors obtaining data from different browsing contexts, communication between browsing contexts is severely constrained. For example, communication between browsing contexts is typically limited to browsing contexts with the same origin and rely on being relayed through multiple components, such as inline frames and shared workers.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the scope of the described embodiments.

To easily identify the discussion of any particular element or act, the most significant digit or digits in a reference number refer to the figure number in which that element is first introduced.

FIG. 4 illustrates a flow diagram of a method for port establishment between different browsing contexts according to some embodiments of the present disclosure.

DETAILED DESCRIPTION

Figure 1:
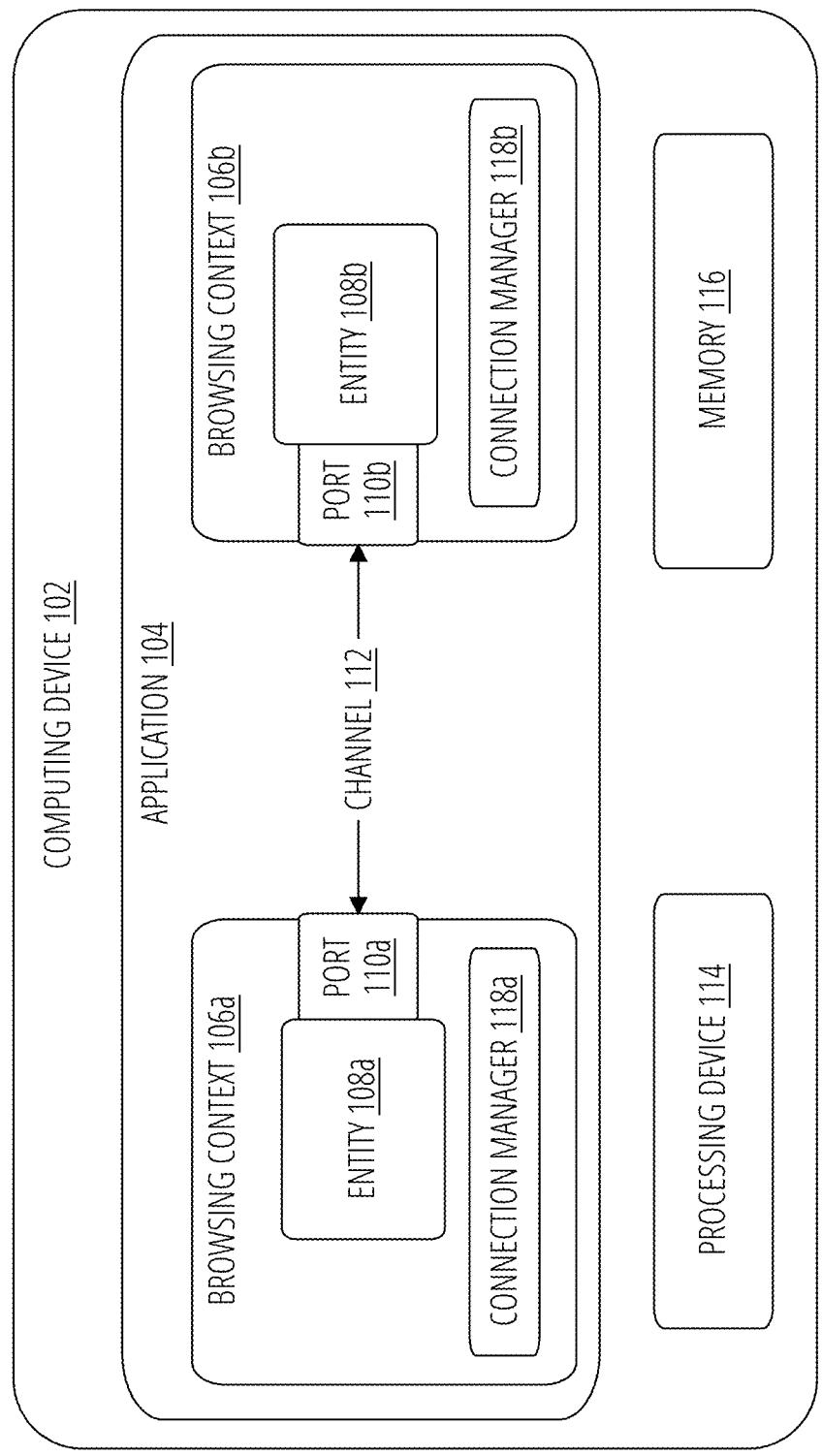
FIG. 1 illustrates an exemplary operating environment for supporting communication between different browsing contexts according to some embodiments of the present disclosure.

The following description sets forth numerous specific details such as examples of specific systems, components, methods, and so forth, in order to provide a good understanding of various embodiments of the techniques described herein for supporting tiered security zones, such as for web-based applications. It will be apparent to one skilled in the art, however, that at least some embodiments may be practiced without these specific details. In other instances, well-known components, elements, or methods are not described in detail or are presented in a simple block diagram format in order to avoid unnecessarily obscuring the techniques described herein. Thus, the specific details set forth hereinafter are merely exemplary. Particular implementations may vary from these exemplary details and still be contemplated to be within the scope of the present disclosure.

Existing techniques for communication between different browsing contexts are computationally inefficient and vulnerable to malicious actors. For example, routing a message between browsing contexts may utilize two inline frames and a shared worker for each message exchange. Such techniques are computationally inefficient because they require an excessive number of serializations and deserializations. For example, routing a message between a first browsing context and a second browsing context using inline frames and a shared worker results in the following message cycle: from the first browsing context to a first inline frame, from the first inline frame to the shared worker, from the shared worker to a second inline frame, and from the second inline frame to the second browsing context. This message route, however, requires four serializations and four deserializations for the payload of each message, resulting in computational inefficiencies. This is particularly challenging for request-response type messaging, which require eight serialization/deserialization cycles for each exchange, and noisy event driven messaging, which requires four serialization/deserialization cycles for each event.

Additionally, such a routing method includes an overly complex mechanism and data path, resulting in excessive and unnecessary attack vectors for malicious actors. For example, the payload may be inspected by each of the inline frames and the shared worker (which may be remotely located), resulting in additional opportunities for malicious actors to access the message contents as well as additional auditing requirements associated with the overly complex data path. In another example, the additional messaging mechanisms and data path segments (e.g., inline frames and shared worker) needed for each message exchange results in unnecessary potential points of failure. For instance, for a browsing context to be able to embed a cross origin inline frame, it must be explicitly allowed via frame-src headers. However, this is still a vector for attack especially if the inline frame provider is a third party (e.g., compromised in a hack, able to inspect payloads, etc.). Adding further complexity, many existing techniques may altogether prevent communication between browsing contexts with different origins, such as to reduce auditing requirements associated with data paths that data flows over. These limitations can drastically reduce the efficiency, security, and usability of communication between different browsing contexts, contributing to vulnerable and unreliable systems with limited capabilities.

Accordingly, many embodiments disclosed hereby provide various techniques for supporting communication between different browsing contexts in an efficient, secure, and reliable manner. Some embodiments are particularly directed to cross origin port establishment for communication between different browsing contexts, including browsing contexts with different origins. Advantageously, the channel established between different browsing contexts may be utilized without the data touching back end infrastructure, resulting in little or no change to the security profile. Various embodiments provide an application programming interface (API) to enable discrete browsing contexts to establish a message channel between each other. For example, a web API may leverage a shared worker to establish a message channel between two contexts enabling the browsing contexts to directly communicate via the message channel. In many embodiments, the techniques disclosed hereby may establish MessagePort connections between discrete, cross origin browsing contexts. In many such embodiments, this may allow browsing contexts to communicate within an application (e.g., web browser) irrespective of their origin without needing to route each message through inline frames and/or a shared worker.

In several embodiments, the message channel is created and/or transferred to the browsing contexts in response to each of the browsing contexts providing a matching connection identifier to the shared worker. In several such embodiments, the connection identifier may be provided to the shared worker as part of handshake operations between the browsing contexts and shared worker. In many embodiments, the origins of the browsing contexts or ports may be exchanged and verified by the respective browsing contexts prior to utilization of the message channel. These techniques can improve efficiency by reducing the number of serialization/deserialization cycles to one for each message. Additionally, these techniques can improve reliability and security. For example, simplifying the mechanism and data path for communication by reducing the intermediaries that handle each message (e.g., inline frames and shared worker), the number of potential points of failure are reduced. In another example, enabling payloads to pass directly from a first browsing context to a second browsing context reduces the number of attack vectors for malicious actors, such as the inline frames and shared worker used to relay a message. Additionally, directly passing the data from the first browsing context to the second browsing context reduces auditing requirements associated with data paths that data flows over. Accordingly, embodiments described hereby provide techniques and features for supporting communication between different browsing contexts in an efficient, reliable, and secure manner that improves the ability to share data between different browsing contexts.

In these and other ways, components/techniques described hereby may provide many technical advantages for supporting communication between different browsing contexts, including browsing contexts with different origins. For example, data sharing between different browsing contexts can be reliably, efficiently, and securely implemented. Additionally, the techniques and features provide a specific interface (e.g., API) and implementation to allow discrete browsing contexts to establish a message channel between each other. Further, the techniques and features described hereby provide particular ways of programming or designing software to verify origins of and create message channels between different browsing contexts to support data sharing between authorized entities. Therefore, the computer-based techniques of the current disclosure improve the functioning of messaging techniques between different browsing contexts, resulting in better performance, improved capabilities, and improved efficiencies as compared to conventional approaches. Accordingly, embodiments disclosed hereby can be practically utilized to improve the functioning of a computer and/or to improve a variety of technical fields including cross origin communication, data security, data sharing, and web-based applications.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 illustrates an operating environment 100 for supporting communication between different browsing contexts according to some embodiments. Operating environment 100 includes a computing device 102 with an application 104, a processing device 114, and a memory 116. The application 104 includes browsing contexts 106a, 106b (collectively referred to as browsing contexts 106). Browsing context 106a includes an entity 108a, a port 110a, and a connection manager 118a. Browsing context 106b includes an entity 108b, a port 110b, and a connection manager 118b. In various embodiments described hereby, a channel 112 may be established directly between the entities 108a, 108b (collectively referred to as entities 108) via ports 110a, 110b (collectively referred to as ports 110). The ports 110 may be endpoints of the channel 112. The connection managers 118a, 118b (collectively referred to as connection managers 118) may operate to initiate creation of and manage the communication channel 112, such as via signaling links with inline frames and a shared worker. One or more components of FIG. 1 may be the same or similar to one or more other components disclosed hereby. Further, aspects discussed with respect to various components in FIG. 1 may be implemented by one or more other components from one or more other embodiments without departing from the scope of this disclosure. For example, the connection managers 118 may include a single connection manager of application 104 or the connection managers 118 may be integrated into the entities 108 without departing from the scope of this disclosure. Embodiments are not limited in this context.

In various embodiments, the application 104 may include a web browser. The entities 108 may operate within or be accessed via the application 104. The browsing contexts 106 may include an environment in which the application 104 displays content (e.g., a document, a webpage, etc.) and serves as an entry point into the content, such as content of the entity. In many embodiments, the browsing context may include a tab, a window, or an interface (e.g., a frame) of the application 104 that the entities are located in or accessible via. Each browsing context may include an origin of the displayed content. In some embodiments, each browsing context may additionally include an ordered history of previously displayed content. In many embodiments, the entities 108 may comprise web-based applications, such as a rich internet application or a single-page application. Embodiments described hereby may enable direct communication via different entities of application 104 with different origins in a secure, efficient, reliable, and scalable manner.

As previously mentioned, the connection managers 118 may initiate and manage the channel 112. More generally, the connection managers 118 may implement aspects of techniques performed from the perspective of the browsing contexts, such as signaling with inline frames and shared workers. For example, each of connection managers 118 may provide a connection identifier via signaling links to a shared worker through respective inline frames. In response, the shared worker may establish channel 112 and transfers the ports 110 to the respective browsing contexts 106. In many embodiments, the connection manager may utilize an application programming interface (API) to communication with other components to initiate and/or manage the channel 112. Creation of the channel 112 and transfer of ports 110 will be described in more detail below, such as with respect to FIGS. 2A-2C. The channel 112 may provide for direct communication between the entities 108. In other words, the entities 108 may communicate via the channel 112 without touching backend infrastructure, such as inline frames and shared workers.

In various embodiments, the connection managers 118 may be implemented during development via libraries along with indications on which entities (e.g., web-based applications) that direct communication channels can be established with. In one embodiment, the connection managers, or functionality thereof, may be accessed via an API. In several embodiments, the connection managers may ensure that the channel 112 between entities 108 is available even if the browsing context of one or more of the entities changes. For example, a connection manager may detect if the browsing context changes and, in response, cause the message channel to be reestablished. In some embodiments, the connection managers 118 may verify the origin of the ports, browsing contexts, and/or entities. For example, connection manager 118a may verify the origin of port 110b, browsing context 106b, and/or entity 108b prior to allowing messages to be sent over the channel 112. The origins of each browsing context may be the same or different.

The origin may include data that enables verification the identity of the port, browsing context, and/or entity. For example, the origin may be the hypertext transfer protocol secure (HTTPS) validated location of the port, browsing context, and/or entity. In various such examples, the origin may be the HTTPS validated location of the entities (e.g., web-based applications) seeking to communicate via channel 112. In some embodiments, the origin 310a may include or be associated with a uniform resource locator (URL) and/or a secure sockets layer (SSL) certificate, such as a URL or SSL certificate corresponding to the browsing context 302a. Similarly, the origin 310b may include or be associated with a URL and/or SSL certificate, such as a URL or SSL certificate corresponding to the browsing context 302b. A URL may include or refer to an address of a unique resource on the internet and is a mechanism utilized by browsers to retrieve published resources. An SSL certificate may include or refer to a file that's hosted on the origin server of a website and contains data that browsers access when viewing or interacting with the page. In many embodiments, the origin may be obtained using a referrer property of an inline frame. Verification of the origin of the ports and/or browsing contexts are described in more detail below, such as with respect to FIGS. 3A-3C.

It should be noted that although a single processing device 114 and a single memory 116 are depicted in the computing device 102 of FIG. 1 for simplicity, other embodiments may include multiple processing devices, storage devices, or devices. Processing device 116 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. processing device 114 may also include one or more special-purpose processing devices such as an application specific integrated circuit (ASIC), a field programmable gate array (FPGA), a digital signal processor (DSP), network processor, or the like. Further details regarding supporting communication between different browsing contexts will be discussed below.

Figure 2A:
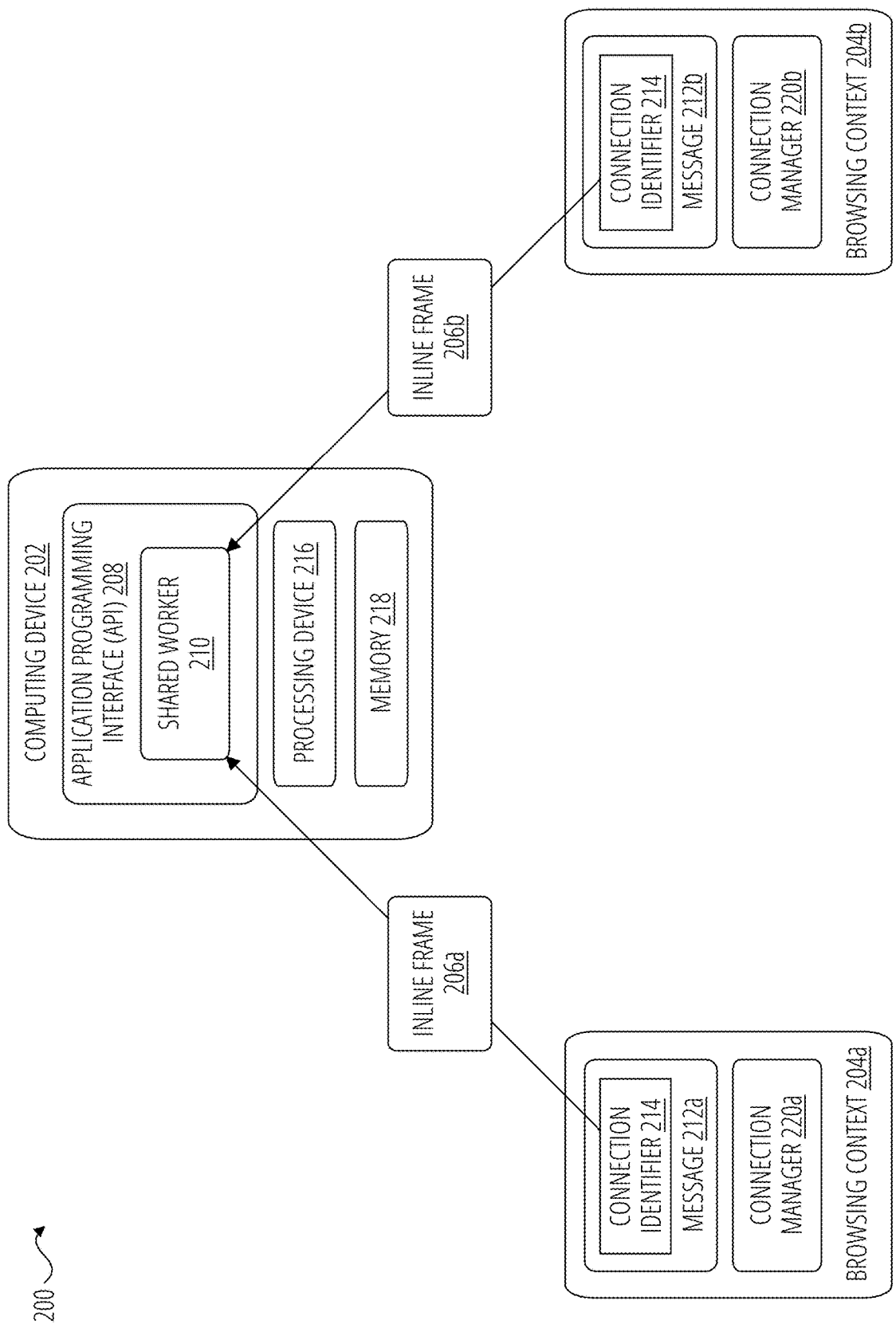
FIGS. 2A-2C illustrate an exemplary process flow for port establishment between different browsing contexts according to some embodiments of the present disclosure.
Figure 2B:
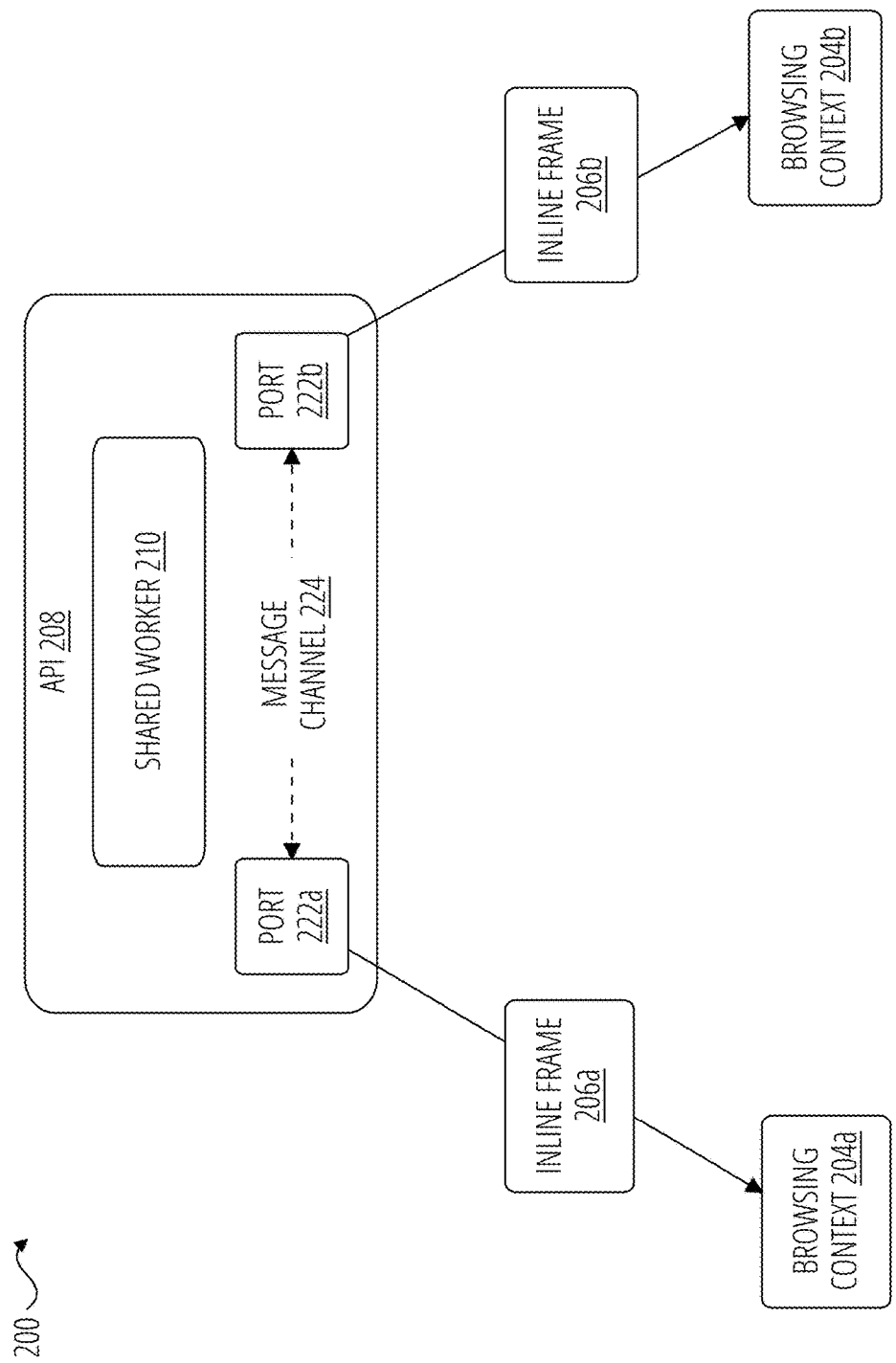
Figure 2C:
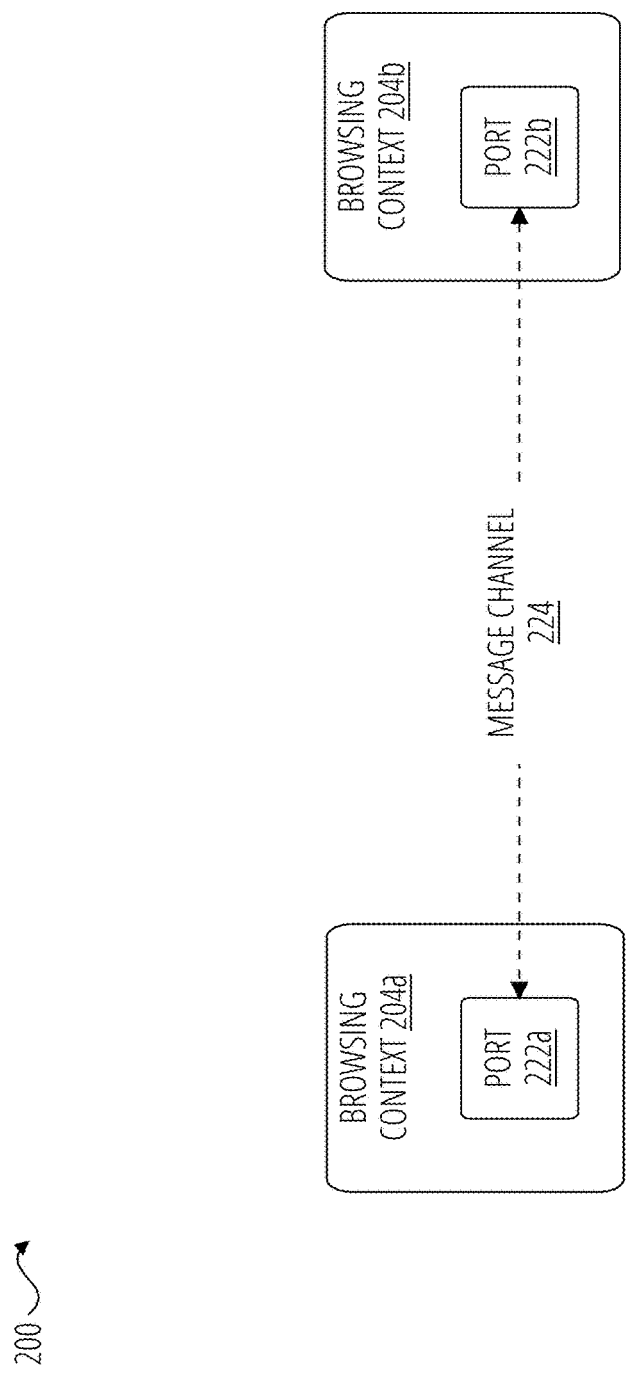

FIGS. 2A-2C illustrate a process flow 200 for port establishment between different browsing contexts according to some embodiments. For example, process flow 200 may support facilitating the direct flow of information between different browsing contexts via a message channel without information flowing through back end infrastructure. More generally, the process flow 500 may illustrate an exemplary process for creating a message channel between different browsing contexts in a secure, scalable, and reliable manner. The illustrated components of FIGS. 2A-2C include a computing device 202, browsing contexts 204a, 204b (collectively referred to as browsing contexts 204), and inline frames 206a, 206b (collectively referred to as inline frames 206). It will be appreciated that some components and/or subcomponents are not illustrated in each of FIGS. 2A-2C for clarity of the description regarding various aspects of process flow 200. One or more components of FIGS. 2A-2C may be the same or similar to one or more other components disclosed hereby. For example, browsing context 204a and browsing context 204b may be the same or similar to browsing context 106a and browsing context 106b, respectively. In another example, connection manager 220a and connection manager 220b may be the same or similar to connection manager 118a and connection manager 118b, respectively. Further, aspects discussed with respect to various components in FIGS. 2A-2C may be implemented by one or more other components from one or more other embodiments without departing from the scope of this disclosure. For example, one or more of browsing contexts 204 and inline frames 206 may be included in computing device 202 without departing from the scope of this disclosure. Embodiments are not limited in this context.

In FIG. 2A, computing device 202 includes an API 208 with a shared worker 210, a processing device 216, and a memory 218. The browsing context 204a includes a message 212a with a connection identifier 214 and connection manager 220a and the browsing context 204b includes a message 212b with the connection identifier 214 and connection manager 220b. As discussed below, the messages 212a, message 212b may be generated and/or transmitted in response to operations included in process flow 200. Process flow 200 may begin with a determination to establish a message channel 224 (see FIG. 2C) between browsing context 204a and browsing context 204b. For example, the determination may occur in response to opening the browsing contexts 204 via a web browser (e.g., application 104), such as to access a web-based application. In another example, the determination may occur in response to opening the web browser.

In response to determining to establish the message channel 224 between browsing context 204a and browsing context 204b, connection manager 220a may transmit the connection identifier 214 to the shared worker 210. For example, connection manager 220a may generate a message 212a with the connection identifier 214 and transmit the message 212a to the shared worker 210 via inline frame 206a. In various embodiments, an inline frame may include or refer to a hyper text markup language (HTML) element that represents a nested browsing context, embedding another page (e.g., HTML page) into the current one. Each embedded browsing context has its own content (e.g., document) and allows URL navigations. The navigations of each embedded browsing context may be linearized into the session history of the topmost browsing context. The browsing context that embeds the others is called the parent browsing context. The topmost browsing context, the one with no parent, is typically the browser window. Referring back to process flow 200, in the illustrated embodiment, the shared worker 210 is accessed via, or included in, the API 208. In other embodiments, however, the shared worker 210 may be utilized without an API or utilized via a separate API, such as an API included in computing device 102. In one embodiment, API 208 includes a web API.

In some embodiments, prior to, or in conjunction with, transmission of message 212a, communication may be established with the shared worker 210 via inline frame 206a. In some such embodiments, this includes a handshake operation. In many embodiments, the message 212a may be utilized to register a receiver for ports. For example, in response to receiving message 212a, shared worker 210 may register the received connection identifier 214 and associate the connection identifier 214 with browsing context 204a. In various embodiments, message 212a may include, or be part of, a promise or promise operation. A promise operation may include or refer to an asynchronous method that enables association of a handler (e.g., browsing context 204a or connection manager 220a) with an eventual success value or failure reason of an asynchronous operation. The eventual success value or failure reason may include, or referred to, as a resolved promise or a promise resolution operation.

Similarly, in response to determining to establish the message channel 224 between browsing context 204a and browsing context 204b, connection manager 220b may transmit the connection identifier 214 to the shared worker 210. For example, connection manager 220b may generate a message 212b with the connection identifier 214 and transmit the message 212b to the shared worker 210 via inline frame 206b. In various embodiments, prior to, or in conjunction with, transmission of message 212b, communication may be established with the shared worker 210 via inline frame 206a. In various such embodiments, this includes a handshake operation. In many embodiments, the message 212b may be utilized to cause the shared worker 210 to establish or open the message channel between browsing context 204a and browsing context 204b. In many such embodiments, message 212b may include, or be part of, a callback function or operation.

Turning to FIG. 2B, in response to determining to establish or open the message channel between browsing context 204a and browsing context 204b, the shared worker 210 may create message channel 224 with port 222a and port 222b. For example, when message 212b with connection identifier 214 is sent to the shared worker 210, the shared worker 210 may create the message channel 224 in response to determining the connection identifier 214 in each of the messages 212a, 212b are the same, such as based on having registered the connection identifier 214 in association with browsing context 204a. After creating the message channel 224, the shared worker 210 may transfer port 222a to browsing context 204a via inline frame 206a and transfer port 222b to browsing context 204b via inline frame 206b. In browsing context 204a, the transfer may surface as a call back and, in browsing context 204b, the transfer may surface as a resolved promise. In some embodiments, the message channel 224 and ports 222a, 222b may be created and/or transferred in response to determining the connection identifier 214 received in message 212b is registered in association with browsing context 204a.

Referring to FIG. 2C, once the ports 222a, port 222b are transferred, data may be exchanged between browsing context 204a and browsing context 204b without having to pass through inline frame 206a, shared worker 210, and/or inline frame 206b. Accordingly, direct communication between the different browsing contexts can be achieved without the data path passing through backend infrastructure. As discussed with respect to FIGS. 3A-3C, in many embodiments, verification of origins may occur as part of establishing a message channel between different browsing contexts.

In some embodiments, the techniques described hereby may be implemented using a variety of coding languages, such as HTML and/or JavaScript™. An example code snippet for a first browsing context (e.g., browsing context 204a) to establish a communication channel with a second browsing context (e.g., browsing context 204b) is shown below. In some embodiments, the code may form a portion of connection manager 220a.

```
const connectionId = uuid( );
const onPortReceived = (port: MessagePort) => {
   port.addListener('message', (ev) => console. log(ev.data));
   port.start( );
}
await portRegistry.registerConnection(connectionId,
onPortReceived);
```

An example code snippet for the second browsing context to establish the communication channel with the first browsing context is shown below. In some embodiments, the code may form a portion of connection manager 220b.

const port=await portRegistry.openConnection(connectionId);
port.start( );
port.postMessage('Hello world')

Advantageously, MessagePorts can be transferred in a postMessage invocation. A MessageChannel creates two ports (e.g., ports 222a, 222b) which can only receive and send messages to one another, but will still work even if both ports have been transferred to discrete browsing contexts (e.g., browsing contexts 204a, 204b). In the example code snippets above, the first browsing context (e.g., browsing context 204a) registers a receiver for ports, and the second browsing context (e.g., browsing context 204b) establishes a connection. Under the hood, a message (e.g., message 212a) including a uuid (e.g., connection identifier 214) is sent to a shared worker (e.g., shared worker 210). The shared worker registers the received connection identifier and associates it with the first browsing context. When the second browsing context opens the connection, it sends a message (e.g., message 212b) including the uuid (e.g., connection identifier 214) to the shared worker. The shared worker then creates a message channel (e.g., message channel 224) having a first port (e.g., port 222a) and a second port (e.g., port 222b). The shared work then transfers a first port (e.g., port 222a) of the message channel to the first browsing context and a second port (e.g., port 222b) of the message channel to the second browsing context. These transfers may surface as a callback in the first browsing context (the receiver) and a resolved promise in the second browsing context. Accordingly, the first port may be transferred to the first browsing context in associated with a callback operation and the second port may be transferred to the second browsing context in association with a promise resolution operation.

Figure 3A:
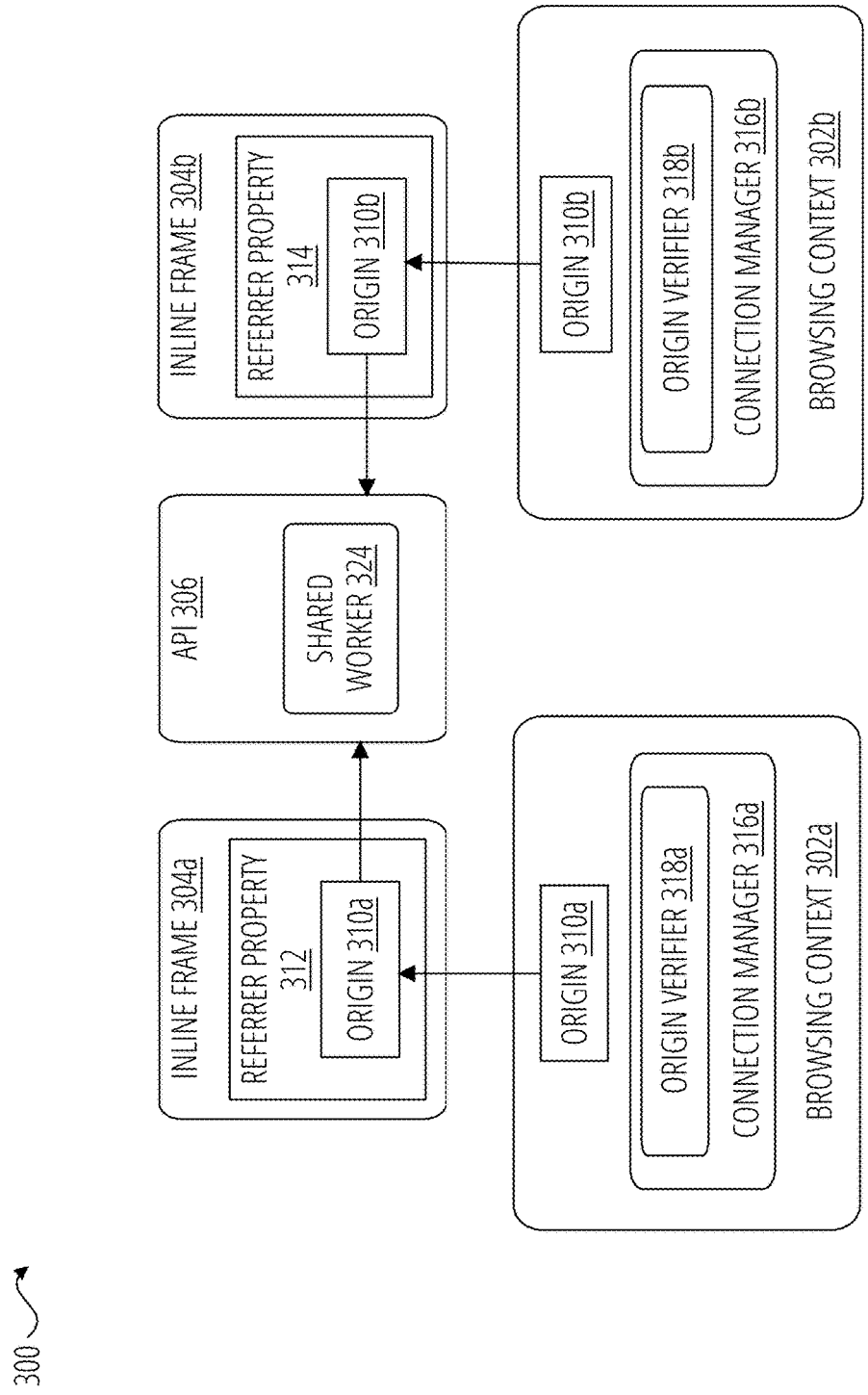
FIGS. 3A-3C illustrates an exemplary process flow for verifying origins of ports for different browsing contexts according to some embodiments of the present disclosure.
Figure 3B:
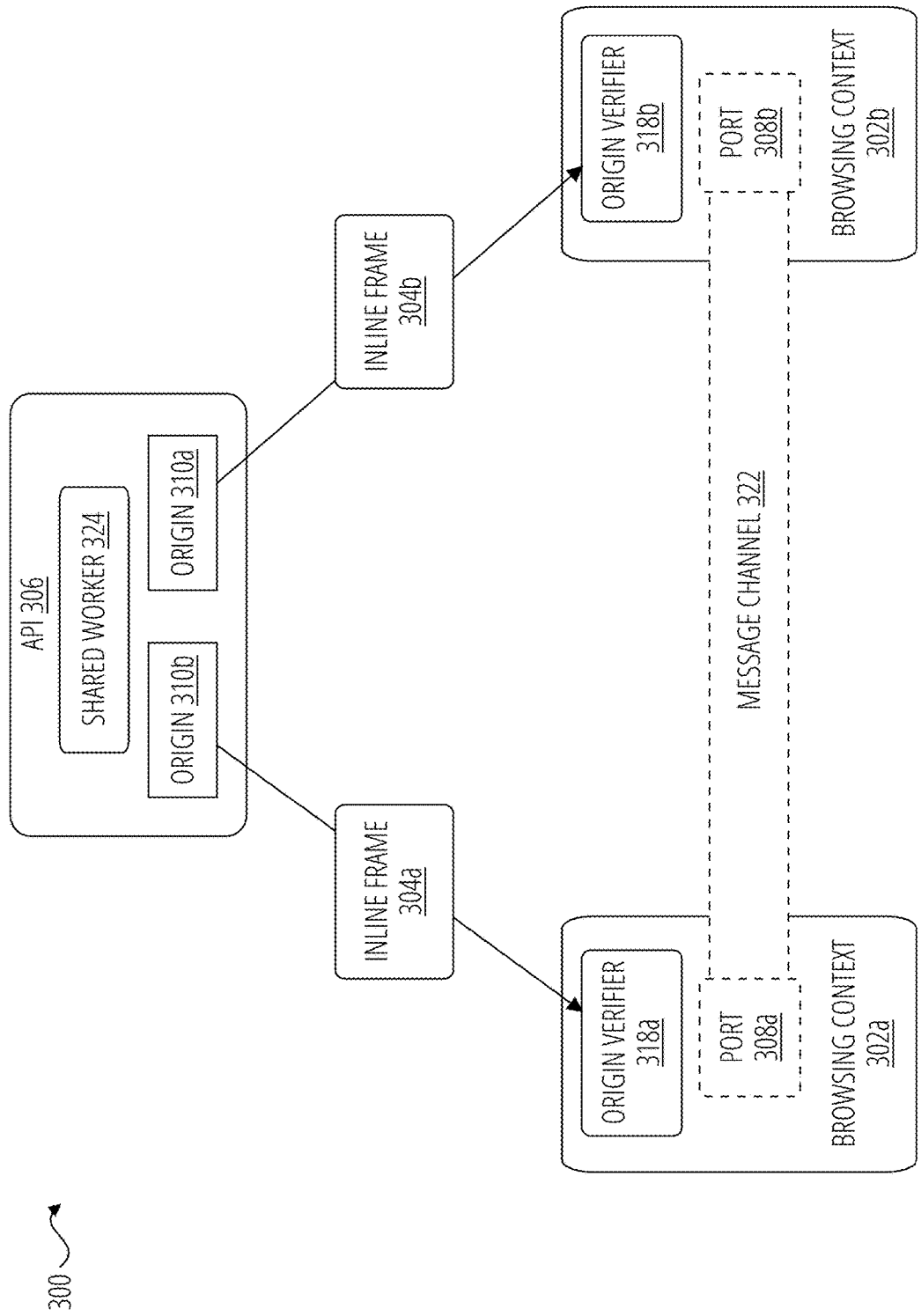
Figure 3C:
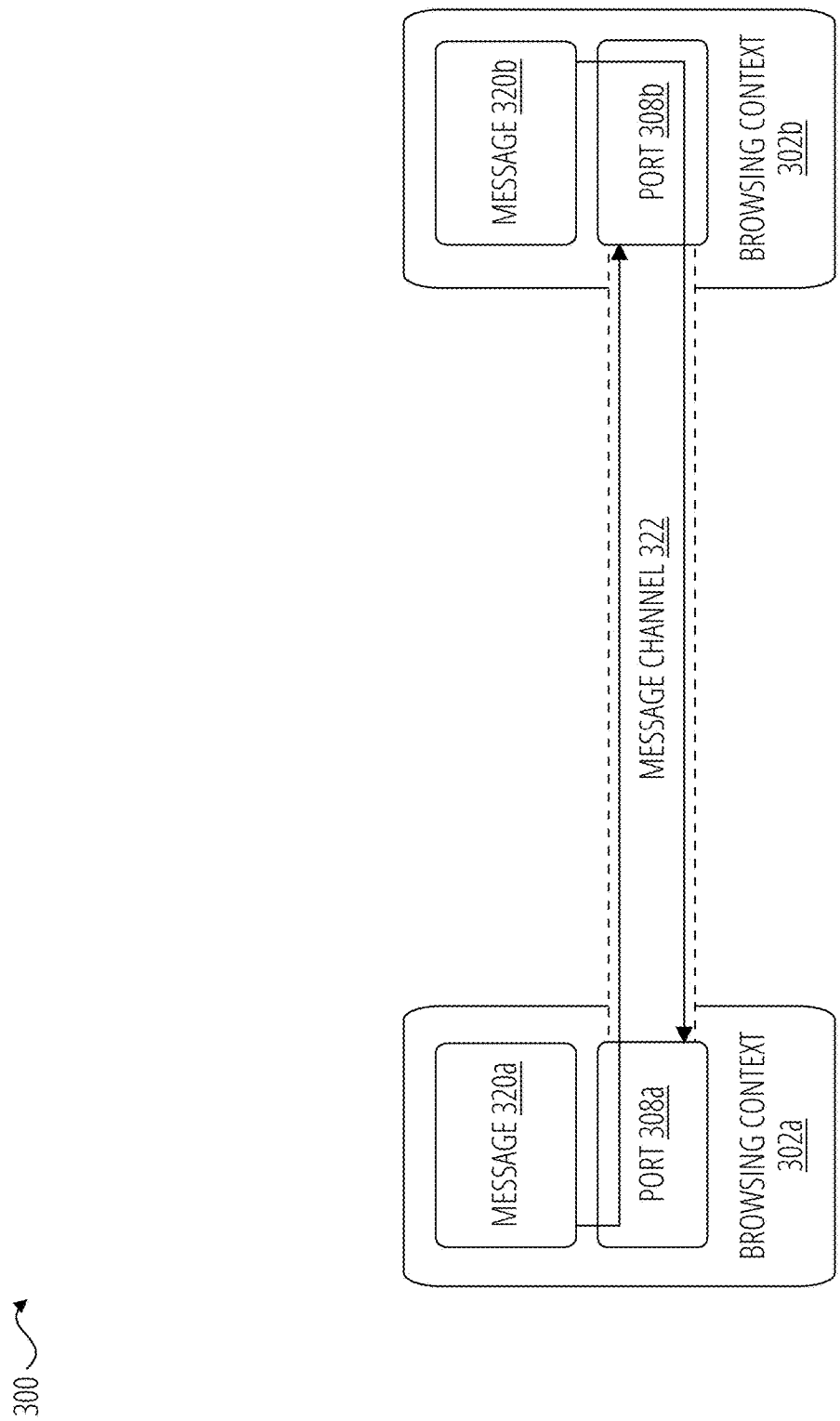

FIGS. 3A-3C illustrate a process flow 300 for verifying origins of ports for different browsing contexts according to some embodiments of the present disclosure. For example, process flow 200 may support enabling browsing contexts to validate the origin of a port, browsing context, and/or entity at the out end of a message channel prior to utilizing the message channel. In many embodiments, process flow 300 may be integrated into or performed in conjunction with process flow 200. The illustrated components of FIGS. 3A-3C include browsing contexts 302a, 302b (collectively referred to as browsing contexts 302), inline frames 304a, 304b (collectively referred to as inline frames 304), and an API 306 with shared worker 324. The browsing contexts 302 each have an origin 310a, 310b and include a connection manager 316a, 316b with an origin verifier 318a, 318b, respectively. The inline frames 304 each have a referrer property 312, 314, respectively. It will be appreciated that some components and/or subcomponents are not illustrated in each of FIGS. 3A-3C for clarity of the description regarding various aspects of process flow 300. One or more components of FIGS. 3A-3C may be the same or similar to one or more other components disclosed hereby. For example, browsing context 302a and browsing context 302b may be the same or similar to browsing context 204a and browsing context 204b, respectively. In another example, connection manager 316a and connection manager 316b may be the same or similar to connection manager 220a and connection manager 220b, respectively. Further, aspects discussed with respect to various components in FIGS. 3A-3C may be implemented by one or more other components from one or more other embodiments without departing from the scope of this disclosure. For example, shared worker 324 may not be included in API 306 without departing from the scope of this disclosure. Embodiments are not limited in this context.

In FIG. 3A, the browsing context 302a may be communicatively coupled to shared worker 324 via inline frame 304a and browsing context 302b may be communicatively coupled to shared worker 324 via inline frame 304b. In the illustrated embodiment, the shared worker 324 is accessed via, or included in, the API 306. In other embodiments, however, the shared worker 324 may be utilized without an API or utilized via a separate API, such as an API included in computing device 102. In one embodiment, API 306 includes a web API. In some embodiments, the origin 310a may include or be associated with a uniform resource locator (URL), such as a URL corresponding to the browsing context 302a. Similarly, the origin 310b may include or be associated with a URL, such as a URL corresponding to the browsing context 302b.

As previously discussed, an inline frame may include or refer to an HTML element that represents a nested browsing context, embedding another page (e.g., HTML page) into the current one. An inline frame may include a referrer property. The referrer property returns the URL of the entity or page that linked to the inline frame. Accordingly, the referrer property 312 of inline frame 304a includes the origin 310a of browsing context 302a and the referrer property 314 of inline frame 304b includes the origin 310b of browsing context 302b. Accordingly, the shared worker 324 may obtain the origins 310a, 310b corresponding to browsing contexts 302a, 302b using the referrer property of the inline frames 304a, 304b. As long as the origin of the inline frames and the shared worker are trusted, then the referrer property can securely and reliably be used to report the origins of the browsing contexts. In some embodiments, this may occur in response to, or as part of, a handshake operation, such as for establishing communication between the browsing contexts and the shared worker. In other embodiments, this may occur in response to receiving connection identifiers of the browsing contexts. In various embodiments, origin 310a and origin 310b may be the same. In other embodiments, origin 310a and origin 310b may be different.

Referring to FIG. 3B, the origin 310b may be provided to browsing context 302a via inline frame 304a and the origin 310a may be provided to browsing context 302b via inline frame 304b. In some embodiments, this occurs in conjunction with transfer of the ports 308a, port 308b to the respective browsing contexts. The origin verifiers 318a, 318b may utilize the origins to verify that the message channel 322 is safe to use (e.g., port location is not being spoofed). For example, the provided origin may be compared to a list of acceptable origins.

Referring to FIG. 3C, if the origins are verified, message channel 322 may be utilized to exchange messages 320a, 320b between the browsing contexts 302a, 302b. Accordingly, as long as the origins of the inline frames 304a, 304b and the origin of the shared worker 324 are trusted, then the message channel 322 can safely be used.

Example code snippets for a first browsing context to establish a communication channel with a second browsing context including origin verification is shown below. In some embodiments, the code may form a portion of connection manager 316a and/or origin verifier 318a.

```
const connectionId = uuid ( );
const onPortReceived = (port: MessagePort, url: string) => {
    // Simple validation scenario - only trust same origin ports
    if (new URL(url).origin === location.origin) {
        port.addListener('message', (ev) =>
    console.log(ev.data));
        port.start ( );
    }
}
await portRegistry.registerConnection(connectionId,
onPortReceived);
```

Example code snippets for the second browsing context to establish the communication channel with the first browsing context is shown below. In some embodiments, the code may form a portion of connection manager 316b and/or origin verifier 318b.

```
const port = await portRegistry.openConnection(connectionId);
    if (new URL(url).origin === location.origin) {
        port.start( );
        port.postMessage('Hello world')
    }
```

In the example above, the origin verification procedure requires the origin of browsing contexts to match. However, in many embodiments, the origins are not required to match. For example, a whitelist of acceptable origins may be utilized to validate origins.

FIG. 4 is a flow diagram of a method 400 for port establishment between different browsing contexts according to some embodiments. Method 400 may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 400 may be performed through the execution of at least one of API 208 or shared worker 210 by processing device 216 of FIGS. 2A-2C and/or application 104, entity 108a, and/or at least one of application 104, connection manager 118a, or connection manager 118b by processing device 114 of FIG. 1.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

Method 400 begins at block 410, where the processing logic identifies a first message from a first browsing context. The first message may include a connection identifier. For example, processing device 216 may identify message 212a including connection identifier 214 from browsing context 204a. In many embodiments, the message 212a may be received via inline frame 206a. In various embodiments, the message 212a may be received via API 208. In various such embodiments, the message 212a may be received at shared worker 210 via the API 208.

Proceeding to block 420, the processing logic may identify a second message from a second browsing context. The second message may include the connection identifier. For example, processing device 216 may identify message 212b including connection identifier 214 from browsing context 204b. In several embodiments, embodiments, the message 212b may be received via inline frame 206b. In some embodiments, the message 212b may be received via API 208. In various such embodiments, the message 212a may be received at shared worker 210 via the API 208.

Continuing to block 430, the processing logic may transfer a first port of a message channel to the first browsing context and a second port of the message channel to the second browsing context based on the first message including the connection identifier and the second connection including the connection identifier. For example, the processing device 216 may transfer port 222a of message channel 224 to browsing context 204a and port 222b of message channel 224 to browsing context 204b. Further, the transfer of ports 222a, 222b may be performed based on message 206a including connection identifier 214 and message 206b including connection identifier 214. In various embodiments, port 222a may be transferred to browsing context 204a via inline frame 206a and port 222b may be transferred to browsing context 204b via inline frame 206b.

Figure 5:
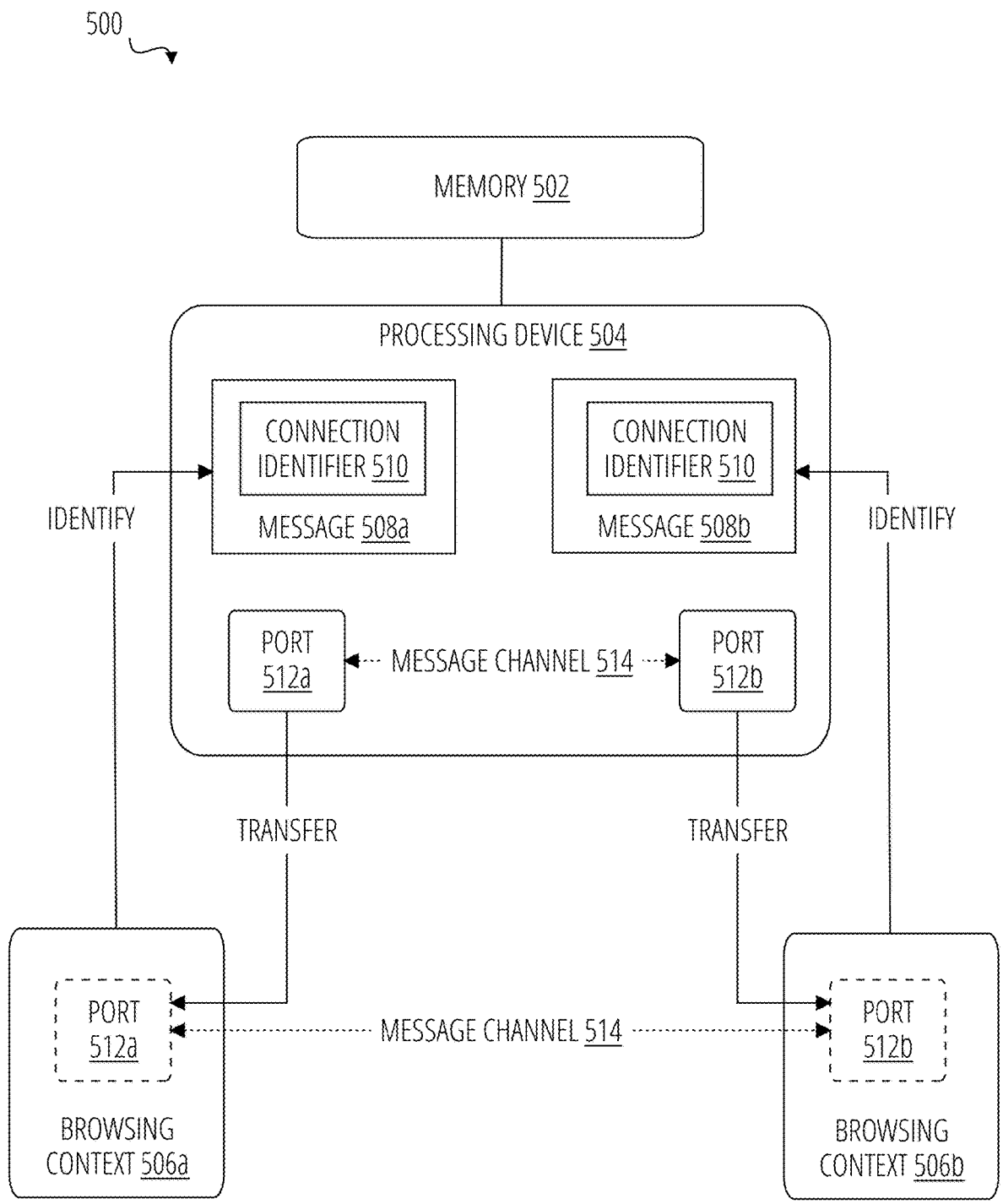
FIG. 5 illustrates a block diagram of an example system for establishing ports between different browsing contexts according to some embodiments of the present disclosure.

FIG. 5 illustrates a block diagram of a system 500 for establishing ports between different browsing contexts according to some embodiments. In the illustrated embodiment, system 500 includes a memory 502, a processing device 504, a first browsing context 506a, and a second browsing context 506b. It should be noted that some components of system 500 are shown for illustrative purposes only and are not physical components of the system 500, such as browsing contexts 506a, 506b, messages 508a, 508b, connection identifier 510, and ports 512a, 512b. One or more components of FIG. 5 may be the same or similar to one or more other components disclosed hereby. For example, processing device 504 may be the same or similar to processing device 216. In another example, ports 512a, 512b, respectively, may be the same or similar to at least one of ports 110a, 110b, ports 222a, 222b, or ports 308a, 308b. Further, aspects discussed with respect to various components in FIG. 5 may be implemented by one or more other components from one or more other embodiments without departing from the scope of this disclosure. For example, browsing context 506a and/or browsing context 506b may be implemented by processing device 504 without departing from the scope of this disclosure. Embodiments are not limited in this context.

In system 500, the processing device 504 may identify message 508a from browsing context 506a. The message 508a may include connection identifier 510. In some embodiments, the processing device 504 may register the connection identifier 514 in association with the first browsing context 506a in response to receiving the message 508a. Further, the processing device 504 may identify message 508b from browsing context 506b. The message 508b may include connection identifier 510. Based on message 508a and message 508b including the connection identifier 510, the processing device 504 may transfer port 512a of message channel 514 to browsing context 506a and transfer port 512b of message channel 514 to browsing context 506b. In some embodiments, the processing device 504 may transfer port 512a of message channel 514 to browsing context 506a and transfer port 512b of message channel 514 to browsing context 506b in response to determining the connection identifier 510 received in the message 508b is registered in association with the browsing context 506a. In various embodiments, the processing device 504 may create the message channel 514 having port 512a and port 512b in response to determining the connection identifier 510 received in the message 508b is registered in association with the first browsing context.

Figure 6:
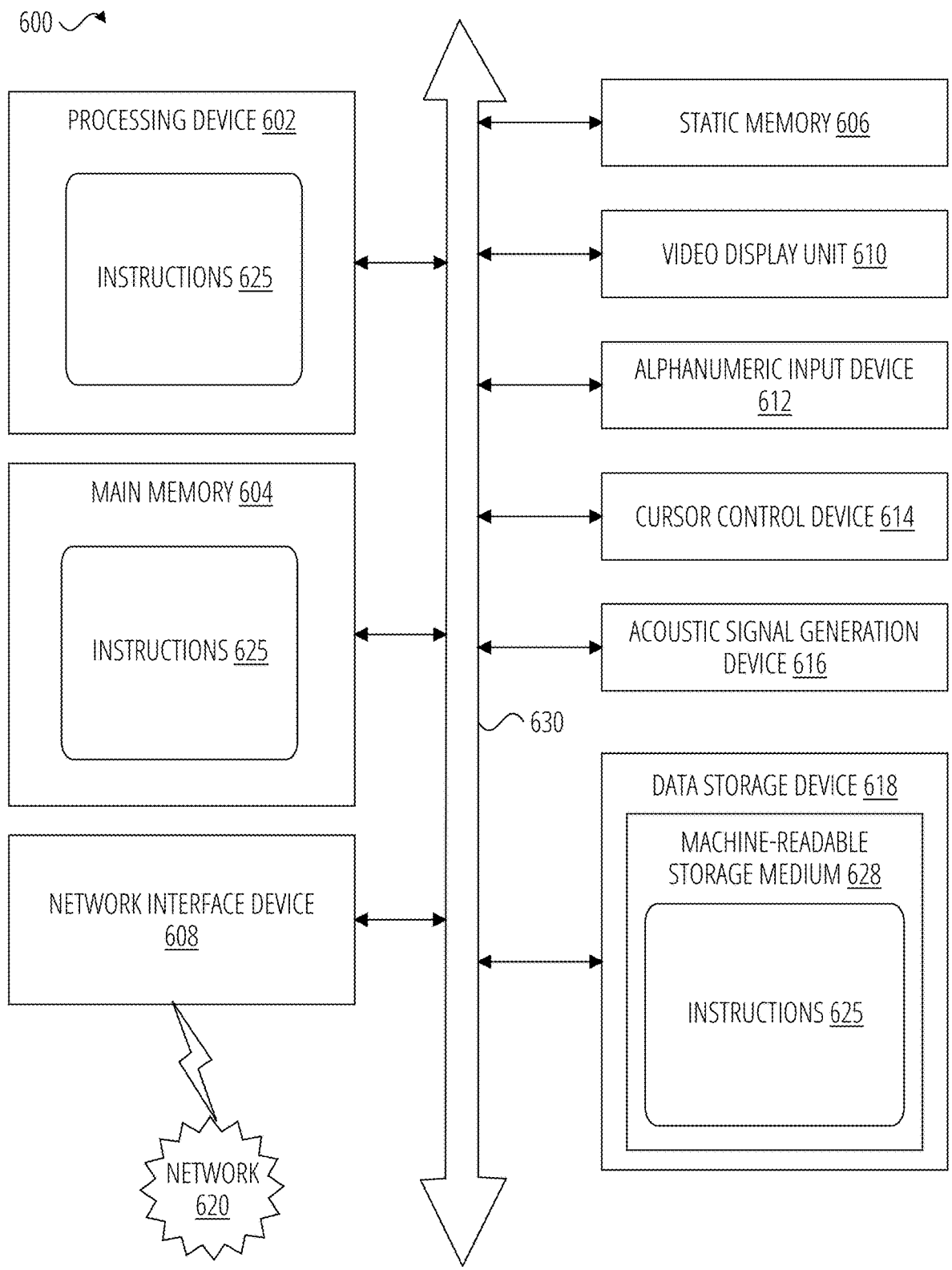
FIG. 6 illustrates a block diagram of an example system according to some embodiments of the present disclosure.

FIG. 6 is a block diagram of an example computing device 600 that may perform one or more of the operations described herein, in accordance with some embodiments of the disclosure. Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device 602 (e.g., a general purpose processor, a PLD, etc.), a main memory 604 (e.g., synchronous dynamic random access memory (DRAM), read-only memory (ROM)), a static memory 606 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also include one or more special-purpose processing devices such as an application specific integrated circuit (ASIC), a field programmable gate array (FPGA), a digital signal processor (DSP), network processor, or the like. The processing device 602 may execute the operations described herein, in accordance with one or more aspects of the present disclosure, for performing the operations and steps discussed herein.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 816 (e.g., a speaker). In one embodiment, video display unit 610, alphanumeric input device 612, and cursor control device 614 may be combined into a single component or device (e.g., an LCD touch screen).

Data storage device 618 may include a machine-readable storage medium 628 on which may be stored one or more sets of instructions 625 that may include instructions for a component (e.g., one or more components of application 104, API 208, shared worker 210, connection manager 316a, connection manager 316b, origin verifier 318a, and/or origin verifier 318b) for carrying out the operations described herein, in accordance with one or more aspects of the present disclosure. Instructions 625 may also reside, completely or at least partially, within main memory 604 and/or within processing device 602 during execution thereof by computing device 600, main memory 604 and processing device 602 also constituting computer-readable media. The instructions 625 may further be transmitted or received over a network 620 via network interface device 608.

While machine-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding, or carrying a set of instructions for execution by the machine and that cause the machine to perform the methods described herein. The term "computer-readable storage medium" shall accordingly be taken to include, but not be limited to, solid-state memories, optical media, and magnetic media.

Figure 7:
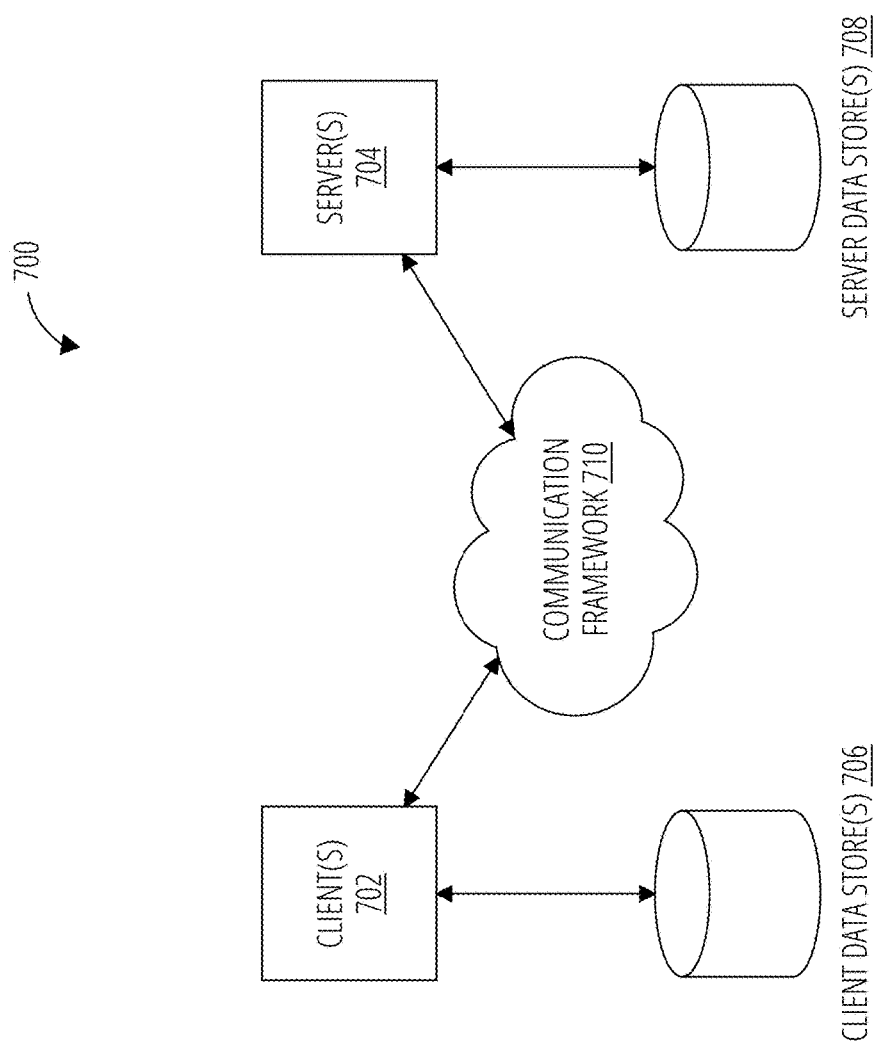
FIG. 7 illustrates exemplary aspects of a communications architecture according to some embodiments of the present disclosure.

FIG. 7 is a block diagram depicting an exemplary communications architecture 700 suitable for implementing various embodiments as previously described, such as communications between browsing context 204a and API 208 or browsing context 204b and API 208, for example. The communications architecture 700 includes various common communications elements, such as a transmitter, receiver, transceiver, radio, network interface, baseband processor, antenna, amplifiers, filters, power supplies, and so forth. The embodiments, however, are not limited to implementation by the communications architecture 700.

As shown in FIG. 7, the communications architecture 700 includes one or more client(s) 702 and server(s) 704. In some embodiments, each client 702 and/or server 704 may include a computing system (e.g., computing device 600). The server(s) 704 may implement one or more devices or components of API 208. The client(s) 702 may implement one or more device or components of computing device 102. The client(s) 702 and the server(s) 704 are operatively connected to one or more respective client data store(s) 706 and server data store(s) 708 that can be employed to store information local to the respective client(s) 702 and server(s) 704, such as cookies and/or associated contextual information. In various embodiments, any one of server(s) 704 may implement one or more logic flows or operations described hereby, such as in conjunction with storage of data received from any one of client(s) 702 on any of server data store(s) 708. In one or more embodiments, one or more of client data store(s) 706 or server data store(s) 708 may include memory accessible to one or more portions of components, applications, and/or techniques described hereby.

The client(s) 702 and the server(s) 704 may communicate information between each other using a communication framework 710. The communication framework 710 may implement any well-known communications techniques and protocols. The communication framework 710 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communication framework 710 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount of speed and capacity, distributed network controller architectures may similarly be employed to pool, load balance, and otherwise increase the communicative bandwidth required by client(s) 702 and the server(s) 704. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other Unless specifically stated otherwise, terms such as "identifying," "transferring," "registering," "creating", "providing", or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may include a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting. As used herein, the term "and/or" includes any and all combination of one or more of the associated listed items.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
identifying a first message from a first browsing context, the first message including a connection identifier;
identifying a second message from a second browsing context, the second message including the connection identifier; and
establishing a message channel for direct communication between the first and second browsing contexts by transferring, by a processing device, a first port of the message channel to the first browsing context and a second port of the message channel to the second browsing context based on the first message including the connection identifier and the second message including the connection identifier.

2. The method of claim 1, further comprising registering the connection identifier in association with the first browsing context in response to receiving the first message.

3. The method of claim 2, wherein the first port of the message channel is transferred to the first browsing context and the second port of the message channel is transferred to the second browsing context in response to determining the connection identifier received in the second message is registered in association with the first browsing context.

4. The method of claim 2, further comprising creating the message channel having the first port and the second port in response to determining the connection identifier received in the second message is registered in association with the first browsing context.

5. The method of claim 1, further comprising:
providing an origin of the second browsing context to the first browsing context in conjunction with transferring the first port of the message channel to the first browsing context; and
providing an origin of the first browsing context to the second browsing context in conjunction with transferring the second port of the message channel to the second browsing context.

6. The method of claim 5, wherein the first message is received at an application programming interface (API) via a first inline frame and the second message is received at the API via a second inline frame.

7. The method of claim 6, wherein the API comprises a shared worker.

8. The method of claim 6, further comprising:
determining the origin of the first browsing context based on a referrer property of the first inline frame; and
determining the origin of the second browsing context based on a referrer property of the second inline frame.

9. The method of claim 1, wherein the first port is transferred to the first browsing context in association with a callback operation or the second port is transferred to the second browsing context in association with a promise resolution operation.

10. The method of claim 1, wherein the first message is received at a shared worker via a first inline frame and the second message is received at the shared worker via a second inline frame.

11. A system comprising:
a memory; and
a processing device, operatively coupled to the memory, to:
identify a first message from a first browsing context, the first message including a connection identifier;
identify a second message from a second browsing context, the second message including the connection identifier; and
transfer a first port of a message channel to the first browsing context and a second port of the message channel to the second browsing context based on the first message including the connection identifier and the second message including the connection identifier to establish the message channel for direct communication between the first and second browsing contexts.

12. The system of claim 11, wherein the processing device is further to register the connection identifier in association with the first browsing context in response to receiving the first message.

13. The system of claim 12, wherein the first port of the message channel is transferred to the first browsing context and the second port of the message channel is transferred to the second browsing context in response to determining the connection identifier received in the second message is registered in association with the first browsing context.

14. The system of claim 12, wherein the processing device is further to create the message channel having the first port and the second port in response to determining the connection identifier received in the second message is registered in association with the first browsing context.

15. The system of claim 11, wherein the processing device is further to:
provide an origin of the second browsing context to the first browsing context in conjunction with transferring the first port of the message channel to the first browsing context; and
provide an origin of the first browsing context to the second browsing context in conjunction with transferring the second port of the message channel to the second browsing context.

16. The system of claim 11, wherein the first message is received at a shared worker via a first inline frame and the second message is received at the shared worker via a second inline frame.

17. A non-transitory computer-readable storage medium including instructions that, when executed by a processing device, cause the processing device to:
identify a first message from a first browsing context, the first message including a connection identifier;
identify a second message from a second browsing context, the second message including the connection identifier; and
transfer, by the processing device, a first port of a message channel to the first browsing context and a second port of the message channel to the second browsing context based on the first message including the connection identifier and the second message including the connection identifier to establish the message channel for direct communication between the first and second browsing contexts.

18. The non-transitory computer-readable storage medium of claim 17, wherein the processing device is further to register the connection identifier in association with the first browsing context in response to receiving the first message.

19. The non-transitory computer-readable storage medium of claim 18, wherein the first port of the message channel is transferred to the first browsing context and the second port of the message channel is transferred to the second browsing context in response to determining the connection identifier received in the second message is registered in association with the first browsing context.

20. The non-transitory computer-readable storage medium of claim 17, wherein the first message is received at a shared worker via a first inline frame and the second message is received at the shared worker via a second inline frame.

* * * * *